United States Patent [19]

Ushitani et al.

[11] 4,127,556
[45] Nov. 28, 1978

[54] CERAMIC FIBER MOLDING FOR MANIFOLD REACTORS

[75] Inventors: Kenji Ushitani; Fumiyoshi Noda; Toshikazu Ikeda, all of Toyota, Japan

[73] Assignee: Toyota Jidosha Kogyo Kabushiki Kaisha, Toyota, Japan

[21] Appl. No.: 725,456

[22] Filed: Sep. 22, 1976

[30] Foreign Application Priority Data
Sep. 29, 1975 [JP] Japan ............................. 50-117428

[51] Int. Cl.² ........................... C08K 3/22; C08K 3/36
[52] U.S. Cl. ..................................... 252/62; 106/65; 106/69; 106/193 R; 106/214; 260/42.51; 260/38
[58] Field of Search ................... 106/65, 69, 193, 214; 106/38, 42.51

[56] References Cited

U.S. PATENT DOCUMENTS

| | | | |
|---|---|---|---|
| 3,231,401 | 1/1966 | Price et al. | 106/69 X |
| 3,799,796 | 3/1974 | Hunter | 106/65 X |
| 3,835,054 | 9/1974 | Olewinski et al. | 106/65 X |

Primary Examiner—Sandra M. Person
Attorney, Agent, or Firm—Brisebois & Kruger

[57] ABSTRACT

Ceramic fiber molding for manifold reactors in which $Al_2O_3$—$SiO_2$ ceramic fibers or $SiO_2$ ceramic fibers are employed to form a molded product having a hardness of 20° – 55°, a tensile strength of 120 – 1500 g/cm² and a molded density of 0.06 – 0.35 g/cm³.

9 Claims, 10 Drawing Figures

CERAMIC FIBER MOLDING FOR MANIFOLD REACTORS

In recent years research has been pursued with a view to developing a recombustion type exhaust gas purifier which reburns the carbon monoxide and hydrocarbons contained in automotive emissions and transforms them into harmless carbon dioxide and water; and as a result manifold reactors having heat-insulated construction has come into practical use. Such a manifold reactor, which serves to collectively transmit the emission from each cylinder to the exhaust pipe, reburns carbon monoxide and hydrocarbons which are among the harmful contents of the automotive emission and transforms them into harmless carbon dioxide and water.

The invention will be better understood from the following explanation, given with reference to the accompanying drawings, in which.

Figure 1:
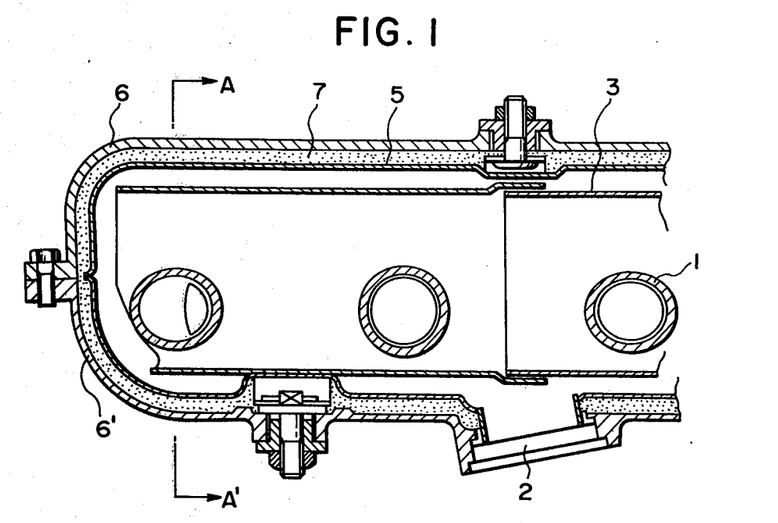
FIG. 1 is a partially fragmentary sectional view of a manifold reactor.
Figure 2:
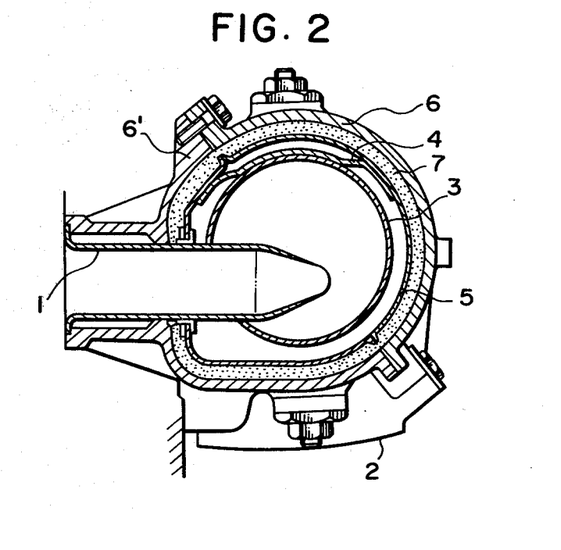
FIG. 2 is a sectional view taken along the line A-A' of FIG. 1.

As illustrated in the partial vertical sectional view of FIG. 1 and in the sectional view of FIG. 2, the manifold reactor is constructed so that the exhaust gas is introduced through the exhaust gas inlet pipe 1 and, after it has been reburned, it is discharged through the exhaust gas discharge pipe 2. A ceramic fiber molding 7 according to the present invention is packed as heat insulation material between the outer tube 5 (which holds the inner tube 3 of the recombustion chamber together with the inner core support 4) and the outer casing which is divisible into two parts 6, 6'.

The manifold reactor can be heat insulated in various ways, for example:

(1) A castable ceramic slurry may be poured into a heat-insulated space and permitted to dry and solidify. (By "castable ceramic slurry" is meant a refractory concrete which usually comprises alumina cement added to a refractory aggregate, such as alumina or clay.)

(2) A packed foaming ceramic powder may be fired and solidified.

(3) A ceramic fiber blanket may be vacuum-packed in a vacuum-resistant plastic bag.

(4) A ceramic fiber blanket may be packed after impregnating it with water for better handling.

(5) A ceramic fiber blanket may be impregnated with water and an inorganic binder, and then packed in to dry and solidify.

(6) A ceramic fiber blanket may be packed in after cutting it into pieces.

A molded product obtained by steps (1) or (2) is so poor in elasticity that, when packed into the inner and outer tubes of the manifold reactor, it cracks because the coefficient of heat expansion of the castable ceramic is lower than those of the inner and outer tubes.

According to methods (3) or (6), when the ceramic fiber blanket in a vacuum-resistant plastic bag is vacuum-packed, the packability improves, but the special plastic bag which is used burns when heated, generating harmful gases. The plastic bag therefore has to be burned away and for this reason installation is expensive and vacuum-packing increases the production cost. Besides, the blanket used in these methods lacks tensile strength and soon breaks, turns to dust or leans to one side, thereby lowering the heat insulating effectiveness of the reactor. In methods (4) or (6) when the blanket is to be manually packed, a worker with allergies cannot be employed. Moreover, since the work is manual, a wide variation occurs in the packed state, resulting in low durability of the product. The method (5), in which the worker has to work with gloves on, acts just like the method (4), yielding products with a wide variation in quality and poor durability.

As described above, various imperfections are noted in the methods of heat-insulating manifold reactors, while the molded ceramic fibers to be used for lining the manifold reactor leave much to be desired. Specifically, the manifold reactor should possess heat resistance, heat insulating properties, and vibration resistance, because it is exposed to heat as high as 1000° C. in the recombustion chamber when in service at the cylinder head exhaust port of the engine. Meanwhile the molded ceramic fibers, which are to be packed into the manifold reactor, have to excel in packability.

Figure 5:
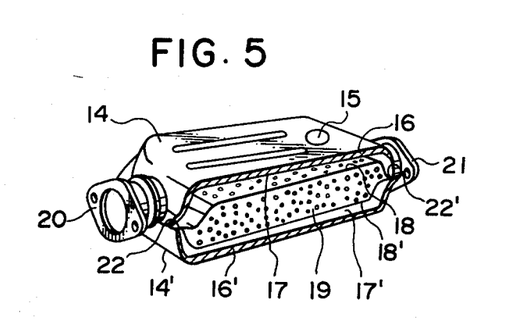
FIG. 5 is a perspective view, including a partial section of a catalytic converter according to the present invention.

The moded ceramic fibers of the present invention can be used to form an improved catalytic converter which transforms the carbon monoxide and hydrocarbons of an engine exhaust into harmless carbon dioxide and water through chemical reaction. As illustrated in FIG. 5, i.e., a longitudinal perspective view including a partial section, a catalyst converter according to the present invention is constructed so that the exhaust gas is introduced from the joint 20 to the exhaust pipe through the inner tube 18 into the catalyst chamber 19. The harmful exhaust gas thus introduced, after being converted to harmless carbon dioxide and water by chemical reaction with the catalyst, is discharged through the inner passage 18', the middle passage 17 and the exhaust pipe joint 21. The molded ceramic fibers 16, 16' according to the present invention are packed as heat insulation into the space between the inner tube formed by the members 18, 18' and the casing halves 14, 14'.

Figure 6:
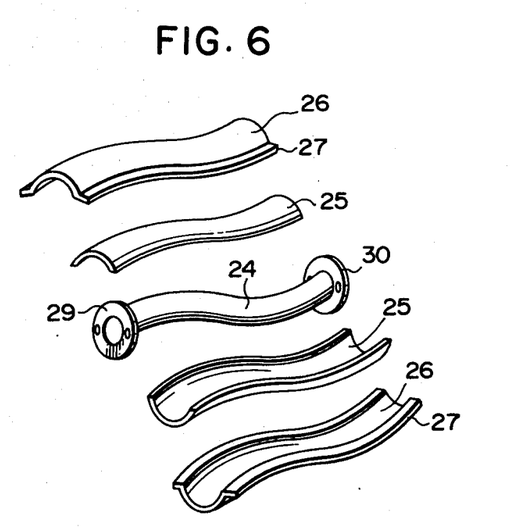
FIG. 6 is an exploded view of an exhaust pipe according to the present invention.
Figure 7:
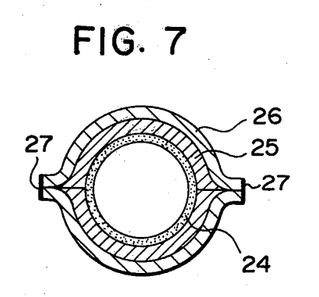
FIG. 7 is a transverse sectional view of the exhaust pipe in FIG. 6 as assembled.

In order to keep the exhaust gas supplied to the catalyst converter hot so that the catalytic converter can work effectively, the exhaust pipe has to be heat-insulated. This is done as seen in FIG. 6, showing an exploded view of the exhaust pipe dismantled, and FIG. 7 showing a longitudinal section of the exhaust pipe assembled, by conveying the harmful exhaust gas emitted from the engine (not shown) to the exhaust pipe joint 29 and discharging it, with its heat retained, through the catalytic converter joint 30. The space between the inner tube 24 and the outer tube 26 is packed with the heat insulating molded ceramic fibers 25 of to the present invention.

As heat insulating material for such a catalytic converter and exhaust pipe, a blanket of $Al_2O_3$—$SiO_2$ ceramic fibers or SiO₂ ceramic fibers is commonly employed. In this case too, just as in the methods (4) or (6) of packing the blanket in the manifold reactor, the packing is done manually and accordingly a worker afflicted with allergies cannot be assigned to the job. This blanket is not strong enough and is so shaped that it does not fit the configuration of the catalytic converter or the exhaust pipe. Specifically, it is a flat plate which is liable to become defective when packed. Moreover, dust generated therefrom affects the other components of the vehicle.

Figure 8:
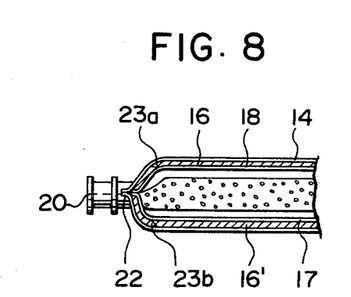
FIG. 8 is a partially fragmentary longitudinal sectional view of another embodiment of the catalytic converter.

As seen from FIG. 8, which shows another example of the catalytic converter, cavities 23a, 23b left in the molded ceramic fibers 16, 16' after being packed (caused because the blanket is cut when packed) lead to a decline in the effectiveness of the heat insulation.

Figure 9:
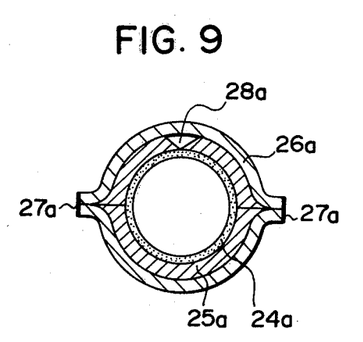
FIGS. 9 and 10 are transverse sectional views through other embodiments of the exhaust pipe.
Figure 10:
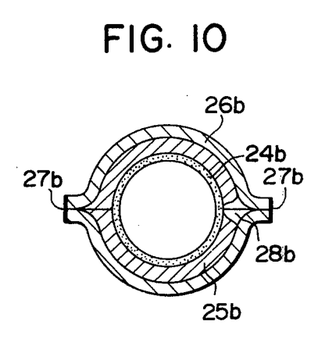

Also, as seen from FIGS. 9 and 10 showing another example of the exhaust pipe, cavities 28a, 28b left in the heat insulator 25a, 25b after it has been packed lead to a decline in the effectiveness of the heat insulation.

After an intensive search for a molded product which retains high elasticity even at high temperatures of 800°–1000° C. and excels in heat insulating ability, packability and durability, we have successfully developed, and describe herein, molded ceramic fiber compositions that are especially for use in manifold reactors.

The molded ceramic fiber compositions of the present invention are characterized by being a molded product of $Al_2O_3$—$SiO_2$ ceramic fibers or $SiO_2$ ceramic fibers having a hardness of 20°–55°, a tensile strength of 120–1500 g/cm² and a molded density of 0.06–0.35 g/cm³.

According to the present invention, the hardness of the molded $Al_2O_3$—$SiO_2$ ceramic fibers or $SiO_2$ ceramic fibers is selected to fall within the range of 20°–55°, because at less than 20° the product is brittle and at more than 55° it is liable to break and lacks packability.

The tensile strength is selected to fall within the range of 120–1500 g/cm², because at less than 120 g/cm² the product lacks durability; at more than 1500 g/cm² the product becomes poor in packability because it becomes too hard (more than 55°) or turns to dust in service, resulting in poor durability.

The molded density of the molded $Al_2O_3$—$SiO_2$ ceramic fibers is selected to fall within the range of 0.15–0.35 g/cm³, because at less than 0.15 g/cm³ the product is brittle, and lacking in packability and durability, while at more than 0.35 g/cm³, it is unable to absorb the heat expansion and the product therefore turns to dust or causes a deformation of the outer tube 5, leading to poor durability. For the same reason the molded density of the molded $SiO_2$ ceramic fibers is selected to fall within the range of 0.06–0.2 g/cm³.

Several embodiments of the present invention will now be described.

EXAMPLE 1

Figure 3:
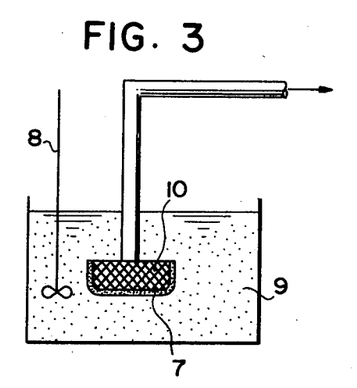
FIG. 3 is a diagram illustrating the vacuum-molding process.

Bulky $Al_2O_3$—$SiO_2$ ceramic fibers having the composition as listed in Table 1, together with starch and water as an organic binder were stirred as shown in FIG. 3 with a stirring machine 8. A highly permeable mold 10 was introduced into the resulting mixed solution and connected to a vacuum pump. Thus said solution was vacuum-molded, dried and solidified to form a ceramic fiber molding 7 for a manifold reactor.

TABLE 1

| Items | Properties of Ceramic Fiber | | |
|---|---|---|---|
| | Characteristic values | | |
| Fiber diameter | A | B | C |
| True specific gravity | Average 2.5μ | Average 2.8μ | Average 4.5μ |
| | 2.65 g/cm³ | 2.56 g/cm³ | 2.50 g/cm³ |
| Melting point | 1,800° C | 1,760° C | 1,750° C |
| Chemical components $Al_2O_3$ | 53% | 50.1% | 47.9% |
| $SiO_2$ | 46% | 49.17 | 51.8% |
| $Fe_2O_3$ | 0.15% | 0.2% | 0.1% |
| $TiO_2$ | 0.15% | 0.2% | Tr |
| $CaO$ | 0.15% | 0.1% | Tr |
| $MgO$ | 0.15% | Tr | Tr |
| $Na_2O$ | 0.4% | 0.3% | 0.2% |

A ... Product of Ibigawa Denki Kogyo K.K.
B ... Product of Isolite-Babcock Refractory K.K.
C ... Product of Nihon Asbestos K.K.

Next, the organic binder content, the hardness, the average fiber length, the tensile strength, the molded density and the packed density of the above mentioned molded products were measured, their durability was tested by a hot-cold vibration test and a durability test in service in a reactor, and their packability was evaluated.

(i) MEASUREMENT OF THE ORGANIC BINDER CONTENT

A sample of about 10g each is taken from 5 spots in the molded product; dried for one hour at 100°–110° C.; and then cooled in a dessicator. After it has been cooled, the sample is measured (weight B) in a previously weighed crucible (weight A); heated to 500°–1000° C. for complete dissolution of the organic binder; cooled to the room temperature in the dessicator; and weighed (weight C). The average organic binder content (% by weight) for the five samples is calculated by the following formula:

$$\text{Organic binder content (\% by weight)} = \frac{B - C}{B - A} \times 100$$

(ii) MEASUREMENT OF HARDNESS

The flat, smooth part of the molded product is measured at 10 spots by a hardness gauge (rubber tester type C manufactured by Kobunshi Keiki with a measurable range of 0°–100°, measurable unit 1°) in accordance with the Japan Rubber Association Standard SRIS-0101; and the average value is taken as its hardness.

(iii) MEASUREMENT OF AVERAGE FIBER LENGTH

A sample of about 5g each is taken from five spots in the molded product, heated to 500°–1000° C. for complete dissolution of the organic binder, and then cooled to room temperature. (When an inorganic binder is used, heating and cooling to the room temperature may be omitted.) The sample is dispersed in ethyl alcohol or in water. The ceramic fibers are picked up by a pincette and transferred to apparatus in which their length is measured using a slide caliper capable of measuring to 0.1 mm and a magnifying glass. The measured values of 100 ceramic fibers are average to give the average fiber length.

(iv) MEASUREMENT OF TENSILE STRENGTH

The flat part of the molded product is cut into five sample pieces having a width of 50 mm, length of 150 mm and thickness of t mm. Variation is allowed to a certain extent in sample sizes. These samples, after 2 hours of heat treatment at 500° C., are measured for width by slide calipers and for thickness to 0.01 mm by a special dial gauge.

Next, using a universal testing machine having a sensitivity higher than 0.1 kg, a gauge length of over 50 mm, a tension speed of 30 mm/min and maximum tensile load of 0.1 kg, the tensile strength is found from the following formula:

$$\text{Tensile strength (g/cm}^2\text{)} = \frac{\text{Maximum load (g)}}{\text{Sample width (cm)} \times \text{thickness (cm)}} - \text{Special dial gauge}$$

Figure 4:
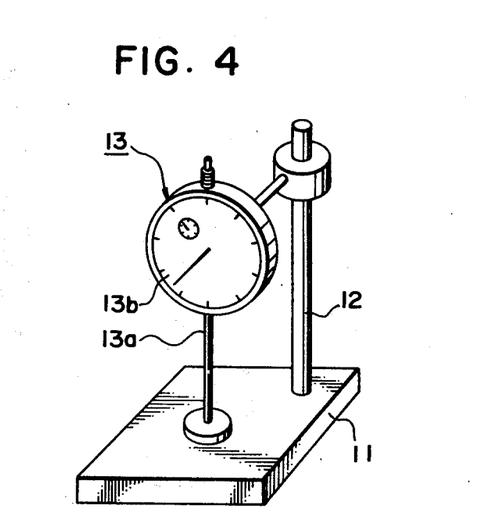
FIG. 4 is a perspective view of a special dial gauge.

As indicated in FIG. 4, a dial gauge 13 (TECLOCK product, no spring) is fastened to the support rod 12 erected on the mount 11. With the measuring member 13a (50 mm carbon steel, about 40g) of the dial gauge lifted, a sample is placed between said measuring member 13a and the mount 11, and the gauge dial 13b is read.

(v) MEASUREMENT OF MOLDED DENSITY

The weight of the molded product is measured to the nearest 0.01g. The thickness of the molded product is measured at more than 10 spots to the nearest 0.01 mm. The measured values are averaged. Then the width and length of the molded product are measured to the nearest 0.01 mm and the molded density is calculated from the following formula:

$$\text{Molded density (g/cm}^3\text{)} = \frac{\text{Weight of molded product (g)}}{\text{Width (cm)} \times \text{length (cm)} \times \text{thickness (cm) of molded product}}$$

(vi) CALCULATION OF PACKED DENSITY

What is called packed density in the present invention assumes that the heat-insulated space of the manifold reactor is packed with molded ceramic fibers.

A sample of 40 mm in diameter is taken from more than five spots in the molded product. The sample weight is measured to the nearest 0.01 g and using the average value of the measurements, the packed density is calculated from the following formula:

$$\text{Packed density (g/cm}^3\text{)} = \frac{\text{Weight of sample (g)}}{3.14 \times 2^2 \times \text{general thickness* (cm) of molded product}}$$

(vii) MEASUREMENT BY HOT-COLD VIBRATION TEST

The molded product packed into the manifold reactor is subjected to 100 cycles of heating at 950°–1050° C. for 10 minutes in the inner tube while simultaneously subjected to 1600 vibrations per minute with a vibrational acceleration of 4.0–5.0 (980 cm/sec$^2$) and a total amplitude 3.0–4.0 mm, followed by air cooling for 10 minutes. Before and after this hot-cold vibration test the change in weight of the molded product is measured and the results are rated as follows:

Rating standard of hot-cold vibration test results:
○ ... good (change less than 10.0% by weight)
△ ... fair (change 10.0–20.0% by weight)
X ... poor (change more than 20.0% by weight)

(viii) MEASUREMENT BY DURABILITY TEST IN SERVICE

The molded product is housed in a manifold reactor and the manifold reactor mounted in an engine is subjected to a durability test under the following operating conditions:

Operating conditions:
 Engine exhaust volume ... 1600 cc
 Combustion chamber exhaust gas temperature ... 900°–1000° C.
Engine drive conditions:
 After (1) 6000 rpm × 100 hours and (2) (6000 rpm + 1000 rpm) × 100,000 cycles, the state of the molded product within the manifold reactor (dusting or dispersion of molded product) is checked and the state rated as follows:

Rating standard of durability test:
○ ... no dust, no dispersion
△ ... a little dust and dispersion (to an extent which causes practically no trouble)
X ... greater part dusted and dispersed

(ix) MEASUREMENT OF PACKABILITY

The time required for the molded product to be packed into the manifold reactor is measured and the results are rated as follows:

Rating standard for packability
○ ... packing time required for one reactor less than 20 sec.
△ ... packing time required for one reactor 20–60 sec.
X ... packing time required for one reactor more than 60 sec.

(x) OVERALL EVALUATION

When either packability or durability is insufficient, in the overall evaluation the product is rated poor (X). The test results are summarized in Table 2.

Table 2
Test results of molded products of Al$_2$O$_3$-SiO$_2$ ceramic fibers using organic binder (starch)
Example 1 ... by vacuum-molding

| Test items Product No. | Binder content (weight %) | Hardness (°) | Average fiber length (mm) | Tensile strength (g/cm$^2$) | Density (g/cm$^3$) Molded | Density (g/cm$^3$) Packed | Durability test Hot-cold vibration | Durability test Service | Pack-ability | Overall rating |
| --- | --- | --- | --- | --- | --- | --- | --- | --- | --- | --- |
| 1 | 0.5 | 7 | 3.5 | 80 | 0.06 | 0.08 | X | X | X | X |
| 2 | 0.7 | 12 | 27.0 | 230 | 0.16 | 0.18 | ○ | ○ | X | X |
| 3 | 1.0 | 27 | 4.0 | 125 | 0.10 | 0.12 | X | X | ○ | X |
| 4 | 2.0 | 38 | 2.3 | 95 | 0.18 | 0.22 | X | X | ○ | X |
| 5 | 2.0 | 37 | 6.0 | 210 | 0.12 | 0.14 | △ | △ | ○ | △ |
| 6 | 2.0 | 38 | 15.5 | 535 | 0.23 | 0.25 | ○ | ○ | ○ | ○ |
| 7 | 4.0 | 47 | 30.0 | 980 | 0.31 | 0.32 | ○ | ○ | ○ | ○ |
| 8 | 5.0 | 50 | 21.3 | 740 | 0.26 | 0.28 | ○ | ○ | ○ | ○ |
| 9 | 6.0 | 52 | 12.5 | 478 | 0.21 | 0.22 | ○ | ○ | ○ | ○ |
| 10 | 6.0 | 51 | 5.7 | 135 | 0.15 | 0.17 | ○ | ○ | ○ | ○ |

Table 2-continued

Test results of molded products of $Al_2O_3$-$SiO_2$ ceramic fibers using organic binder (starch)
Example 1 ... by vacuum-molding

| Test items Product No. | Binder content (weight %) | Hardness (°) | Average fiber length (mm) | Tensile strength (g/cm²) | Density (g/cm³) Molded | Density (g/cm³) Packed | Durability test Hot-cold vibration | Durability test Service | Pack-ability | Overall rating |
|---|---|---|---|---|---|---|---|---|---|---|
| 11 | 7.0 | 68 | 10.5 | 425 | 0.18 | 0.20 | ○ | ○ | × | × |
| 12 | 8.0 | 73 | 7.6 | 270 | 0.15 | 0.18 | Δ | Δ | × | × |
| 13 | 9.0 | 82 | 3.2 | 95 | 0.20 | 0.21 | × | Δ | × | × |
| 14 | 10.0 | 89 | 2.5 | 88 | 0.11 | 0.12 | × | × | × | × |
| 15 | 7.0 | 760 | 11.5 | 350 | 0.12 | 0.21 | ○ | ○ | × | × |
| 16 | 0.5 | 7 | 13.0 | 180 | 0.14 | 0.26 | ○ | ○ | × | × |
| 17 | 4.0 | 46 | 33.0 | 1470 | 0.34 | 0.35 | ○ | ○ | ○ | ○ |
| 18 | 7.0 | 70 | 31.5 | 1250 | 0.33 | 0.34 | ○ | ○ | × | × |
| 19 | 7.0 | 72 | 38.5 | 1650 | 0.39 | 0.40 | Δ | Δ | × | × |
| 20 | 9.0 | 96 | 40.5 | 1710 | 0.42 | 0.43 | Δ | Δ | × | × |

As seen from Table 2, the products Nos. 1, 2 and 16 with a hardness of less than 12° or more than 68° L were definitely poor in packability, while Nos. 1–5 and 11–16 with a tensile strength less than 120 g/cm² and a molded density less than 0.15 g/cm³ had their heat-insulating effect decreased during the durability test because the fibers became embrittled, turned to dust, or became dispersed or became concentrated at one side in the heat-insulating space.

In Nos. 12 and 13 with an increased hardness, packability dropped though durability improved; and in Nos. 15 and 16 with a decreased molded density, packability improved but durability dropped.

In Nos. 19 and 20 with a tensile strength of more than 1,500 g/cm², packability became extremely poor. For these reasons, the molded product according to the present invention has to meet the conditions that the hardness is 20°–55°, tensile strength is 120–1500 g/cm² and molded density is 0.15–0.35 g/cm³ to assure both high packability and high durability.

EXAMPLE 2

Molded ceramic fibers for a manifold reactor were produced using $Al_2O_3$—$SiO_2$ ceramic fibers as in Example 1 and a phenol resin as the organic binder by the following molding processes.

Molding processes:

Special molded blanket process ... A mat impregnated with phenol resin as the organic binder is taken from the ceramic fiber blanket manufacturing process, and dried to solidify in a mold.

Molded blanket process ... A ceramic fiber blanket impregnated with phenol resin as the organic binder is dried to solidify in a mold.

Special vacuum-molding process ... A ceramic fiber blanket is impregnated with phenol resin as the organic binder, and molded and dried in a highly permeable vacuum-mold.

Thereafter, in the same way as in Example 1, the resulting products were subjected to various tests for physical properties and durability. In Example 1, the hot-cold vibration test and the service test yielded nearly identical results with no problem in their evaluation, but in Example 2 some of the tests were limited to hot-cold vibration. The results are summarized in Table 3.

Table 3

Test results of molded products of $Al_2O_3$-$SiO_2$ ceramic fibers using organic binder (phenol resin)
Example 2 ... by various molding processes

| Test items Product No. | Processes | Binder content (weight) % | Hardness (°) | Average fiber length (mm) | Tensile strength (g/cm²) | Density (gm/cm³) Molded | Density (gm/cm³) Packed | Durability test Hot-cold vibration | Durability test Service | Pack-ability | Overall rating |
|---|---|---|---|---|---|---|---|---|---|---|---|
| 101 | Special vacuum-mold | 0.5 | 13 | 2.4 | 75 | 0.08 | 0.10 | × | × | × | × |
| 102 | " | 2.0 | 29 | 8.5 | 130 | 0.12 | 0.13 | Δ | — | ○ | Δ |
| 103 | " | 2.0 | 30 | 20.4 | 235 | 0.15 | 0.17 | ○ | — | ○ | ○ |
| 104 | Molded blanket | 3.0 | 35 | 3.0 | 84 | 0.10 | 0.11 | × | — | ○ | × |
| 105 | " | 3.0 | 37 | 12.5 | 126 | 0.08 | 0.10 | × | × | ○ | × |
| 106 | Special molded blanket | 0.5 | 13 | 3.5 | 86 | 0.08 | 0.07 | × | — | × | × |
| 107 | " | 0.5 | 14 | 4.6 | 120 | 0.24 | 0.25 | Δ | — | × | × |
| 108 | Special vacuum-mold | 2.0 | 30 | 14.7 | 385 | 0.30 | 0.31 | ○ | — | ○ | ○ |
| 109 | " | 2.0 | 23 | 27.0 | 450 | 0.21 | 0.22 | ○ | ○ | ○ | ○ |
| 110 | Molded blanket | 3.0 | 35 | 15.5 | 335 | 0.18 | 0.20 | ○ | ○ | ○ | ○ |
| 111 | " | 3.0 | 38 | 8.7 | 274 | 0.31 | 0.32 | ○ | ○ | ○ | ○ |
| 112 | Special molded blanket | 4.0 | 44 | 7.5 | 240 | 0.30 | 0.32 | ○ | — | ○ | ○ |
| 113 | " | 4.0 | 42 | 6.7 | 255 | 0.20 | 0.22 | ○ | ○ | ○ | ○ |
| 114 | " | 4.0 | 45 | 26.3 | 280 | 0.18 | 0.19 | ○ | — | ○ | ○ |
| 115 | Special vacuum-mold | 7.0 | 74 | 8.2 | 167 | 0.18 | 0.20 | ○ | ○ | × | × |
| 116 | " | 7.0 | 76 | 4.0 | 96 | 0.10 | 0.12 | ○ | — | × | × |
| 117 | Molded blanket | 7.0 | 72 | 10.7 | 115 | 0.16 | 0.17 | Δ | ○ | × | × |
| 118 | " | 7.0 | 74 | 4.5 | 85 | 0.13 | 0.13 | × | — | × | × |
| 119 | Special molded blanket | 8.0 | 83 | 19.5 | 218 | 0.17 | 0.19 | Δ | Δ | × | × |
| 120 | " | 8.0 | 80 | 3.7 | 70 | 0.10 | 0.11 | × | — | × | × |
| 121 | " | 4.0 | 45 | 32.8 | 1450 | 0.34 | 0.356 | ○ | ○ | ○ | ○ |
| 122 | " | 8.0 | 83 | 30.5 | 1100 | 0.32 | 0.33 | ○ | — | × | × |
| 123 | Molded blanket | 8.0 | 82 | 37.5 | 1590 | 0.38 | 0.39 | Δ | — | × | × |

As is evident from Table 3, there is no difference in packability and durability depending on the molding process and the overall rating depends on the characteristic values of the molded product. For instance in Nos. 101, 106, 107 and 115–120, 122 with hardness values other than 20°–55°, packability is poor; in the products with a tensile strength of less than 120 g/cm² or a molded density of less than 0.15 g/cm³, durability is poor; and in No. 123 with a tensile strength of more than 1500 g/cm², packability is poor.

From these examples it is confirmed that, regardless of its molding process, a molded product with a hardness of 20°-55°, a tensile strength of 120-1500 g/cm² and a molded density of 0.15-0.35 g/cm³ excels in packability and durability.

Similar results were obtained when the organic binder was starch or polyvinyl alcohol.

EXAMPLE 3

Using a mixed solution of $Al_2O_3$—$SiO_2$ ceramic fibers according to Example 1 and either $Al_2O_3$ sol as an inorganic binder or starch as an organic binder, molded ceramic fibers for a manifold reactor were produced according to the vacuum-molding process of Example 1.

The molded products thus obtained were subjected to various tests for physical properties and durability in the same way as in Example 1. Just as in Example 2, in some cases with the reactor test omitted, evaluation was made of the results of hot-cold vibration tests alone, the results being summarized in Table 4.

g/cm³ in molded density, durability is inferior. In Nos. 203 and 204 which meet the hardness and molded density requirements of the present invention but are as low as 108 g/cm² in tensile strength, both durability and packability are poor. And in Nos. 219 and 220, with tensile strength higher than 1500 g/cm², both durability and packability are also poor.

EXAMPLE 4

$SiO_2$ ceramic fibers of the composition shown in Table 5 and starch as an organic binder were placed in water, and molded ceramic fibers for manifold reactor were then produced according to the vacuum-molding process of Example 1.

TABLE 5

| | Properties of $SiO_2$ fibers | |
|---|---|---|
| Items | | Characteristic Values |
| Fiber diameter | | 0.5 – 2.0μ |
| True specific gravity | | 2.6 g/cm³ |
| Melting point | | 1685° C |
| Chemical | $SiO_2$ | 98.1% |
| Composition | $NaO$, etc. | 1.9% |

Note: $SiO_2$ ceramic fibers manufactured by Nihon Glass Fiber Co. were used.

Table 4

Test results of molded products of $Al_2O_3$-$SiO_2$ ceramic fibers using inorganic binder ($Al_2O_3$ sol) and organic binder (starch) Example 3 ... by vacuum-molding process

| Test items Product No. | Binder content (weight %) $Al_2O_3$ sol | starch | Hardness (°) | Average fiber length (mm) | Tensile strength (g/cm²) | Density (g/cm³) Molded | Packed | Durability test Hot-cold vibration | service | Pack-ability | Overall rating |
|---|---|---|---|---|---|---|---|---|---|---|---|
| 201 | 0.5 | — | 11 | 2.3 | 62 | 0.07 | 0.09 | × | — | × | × |
| 202 | 0.5 | 0.3 | 14 | 3.1 | 67 | 0.08 | 0.13 | × | × | × | × |
| 203 | 0.5 | 0.5 | 16 | 4.8 | 108 | 0.15 | 0.15 | × | — | × | × |
| 204 | 1.0 | 0.5 | 22 | 5.0 | 116 | 0.15 | 0.16 | △ | △ | △ | △ |
| 205 | 1.0 | 1.0 | 30 | 5.6 | 162 | 0.17 | 0.20 | ○ | ○ | ○ | ○ |
| 206 | 2.0 | 1.0 | 38 | 12.3 | 340 | 0.11 | 0.12 | × | — | ○ | × |
| 207 | 2.0 | 1.0 | 39 | 15.6 | 557 | 0.21 | 0.23 | ○ | ○ | ○ | ○ |
| 208 | 3.0 | — | 43 | 13.3 | 725 | 0.22 | 0.26 | ○ | ○ | ○ | ○ |
| 209 | 4.0 | 1.0 | 49 | 10.1 | 830 | 0.20 | 0.22 | ○ | — | ○ | ○ |
| 210 | 5.0 | 0.5 | 52 | 19.3 | 912 | 0.17 | 0.19 | ○ | ○ | ○ | ○ |
| 211 | 6.0 | 0.5 | 53 | 3.4 | 941 | 0.11 | 0.14 | × | △ | ○ | × |
| 212 | 6.0 | — | 50 | 2.3 | 936 | 0.15 | 0.16 | × | — | ○ | × |
| 213 | 6.0 | 1.0 | 58 | 9.8 | 1150 | 0.17 | 0.18 | ○ | ○ | △ | △ |
| 214 | 8.0 | 1.0 | 76 | 7.1 | 1325 | 0.20 | 0.21 | △ | △ | × | × |
| 215 | 10.0 | — | 82 | 8.5 | 1470 | 0.11 | 0.11 | △ | — | × | × |
| 216 | 10.0 | 0.5 | 89 | 3.3 | 1416 | 0.10 | 0.13 | × | — | × | × |
| 217 | 3.0 | 1.0 | 45 | 32.0 | 1480 | 0.33 | 0.34 | ○ | — | ○ | ○ |
| 218 | 4.0 | — | 44 | 3.5 | 1370 | 0.32 | 0.33 | △ | △ | ○ | △ |
| 219 | 8.0 | 1.0 | 78 | 20.5 | 1720 | 0.36 | 0.37 | × | × | × | × |
| 220 | 10.0 | — | 85 | 12.5 | 1870 | 0.38 | 0.38 | × | — | × | × |

As seen from Table 4, molded products using either an inorganic binder or an organic binder and meeting the conditions of the present invention for hardness, tensile strength and molded density, excel in both durability and packability. For instance in Nos. 206 and 211, which meet the hardness and tensile strength requirements of the present invention, but are as low as 0.11

The molded products thus obtained were, as in Example 1, subjected to various tests for physical properties and durability, the results being summarized in Table 6.

Table 6

Test results of molded products of $SiO_2$ ceramic fibers using organic binder (starch) Example 4 ... by vaccum-molding process

| Test items Product No. | Binder content (weight %) | Hardness (°) | Average fiber length (mm) | Tensile strength (g/cm²) | Density (g/cm³) molded | packed | Durability test Hot-cold vibration | service | Pack-ability | Overall rating |
|---|---|---|---|---|---|---|---|---|---|---|
| 301 | 0.5 | 8 | 2.0 | 65 | 0.04 | 0.05 | × | — | × | × |
| 302 | 1.0 | 25 | 5.5 | 180 | 0.05 | 0.08 | △ | — | ○ | △ |
| 303 | 2.0 | 36 | 8.8 | 455 | 0.08 | 0.08 | ○ | ○ | ○ | ○ |
| 304 | 3.0 | 43 | 13.0 | 690 | 0.09 | 0.10 | ○ | — | ○ | ○ |
| 305 | 4.0 | 48 | 26.0 | 1405 | 0.18 | 0.20 | ○ | — | ○ | ○ |
| 306 | 5.0 | 52 | 24.5 | 1380 | 0.16 | 0.17 | ○ | ○ | ○ | ○ |
| 307 | 5.0 | 50 | 4.0 | 135 | 0.05 | 0.06 | △ | — | ○ | △ |
| 308 | 6.0 | 54 | 4.7 | 128 | 0.05 | 0.05 | × | — | × | × |
| 309 | 8.0 | 75 | 11.5 | 830 | 0.11 | 0.12 | ○ | — | × | × |
| 310 | 10.0 | 90 | 7.0 | 140 | 0.04 | 0.04 | × | — | × | × |
| 311 | 8.0 | 77 | 30.5 | 1570 | 0.20 | 0.21 | △ | — | × | × |

Table 6-continued

Test results of molded products of $SiO_2$ ceramic fibers using organic binder (starch)
Example 4 ... by vaccum-molding process

| Test items Product No. | Binder content (weight %) | Hardness (°) | Average fiber length (mm) | Tensile strength (g/cm$^2$) | Density (g/cm$^3$) molded | Density (g/cm$^3$) packed | Durability test Hot-cold vibration | Durability test service | Pack-ability | Overall rating |
|---|---|---|---|---|---|---|---|---|---|---|
| 312 | 10.0 | 92 | 33.0 | 1310 | 0.21 | 0.22 | Δ | — | 3 | × |

As seen from Table 6, even when satisfactory in hardness at 20°–55° and in tensile strength at 120–1500 g/cm$^2$, a molded product such as No. 302 with a molded density less than 0.06 g/cm$^3$ is poor in durability and packability, while products such as Nos. 309, 310, which are satisfactory as to molded density at 0.06–0.20 g/cm$^3$ molded density and in tensile strength at 120–1500 g/cm$^2$, are inferior in packability. In Nos. 311, 312 with a tensile strength higher than 1500 g/cm$^2$, packability drops.

A molded product of over 0.20 g/cm$^3$ in molded density could not absorb deformation of the material due to thermal expansion in the durability test and failed. In the present example, starch was employed as the organic binder, but polyvinyl alcohol, C.M.C. etc. may also be used.

From the results of the present example it is confirmed that the molded $SiO_2$ ceramic fibers should meet the conditions that they have a hardness of 20°–55°, tensile strength of 120–1500 g/cm$^2$, and molded density of 0.06–0.20 g/cm$^3$.

REFERENCE EXAMPLE 1

Molded ceramic fiber products with excellent packability and durability, Nos. 8, 9, 113, 208, 306 as obtained in Examples 1, 2, 3 and 4, after having been subjected to a durability test in service in a catalytic converter and exhaust pipe (the test conditions being the same as in viii), were taken out for observation of dusting and dispersion. The results show that, with no cavity in the packing, no dusting and no dispersion the products excel in packability and durability in the same way as when in service in a manifold reactor. And unlike the case of blanket packing, no complaint was made by the worker and no adverse effect on the working environment was observed.

REFERENCE EXAMPLE 2

When in Example 4, molded products of ceramic fibers with a hardness of 40°, an average fiber length of 12.5 mm, a tensile strength of 550 g/cm$^2$, molded density of 0. 21 g/cm$^3$ and a packed density of 0.23 g/cm$^2$, using an organic binder (starch 1.0%) and an inorganic binder (silica sol 2.0%) were submitted to a durability test in service in a catalytic converter and exhaust pipe (the test conditions being the same as in viii), both packability and durability turned out to be excellent.

And unlike the blanket packing process no worker's complaint was heard and no adverse effect on the working environment was noted.

As described above, the molded ceramic fibers for a manifold reactor according to the present invention are characterized by high elasticity at high temperatures, excellent heat insulating ability, excellent packability and durability, no dusting, no dispersion, no concentration at one side in the heat insulated space during use, and accordingly they preserve a high temperature in the manifold, reburn carbon monoxide and hydrocarbons, make the catalytic converter action more efficient, and render the emission gases harmless. Thus the present invention is highly valuable from the standpoint of industry and pollution control.

What is claimed is:

1. A ceramic fiber molding comprising $Al_2O_3$—$SiO_2$ or $SiO_2$ ceramic fibers and a binder molded into a product having a hardness of 20°–55° as measured by the Japan Rubber Association Standard SRIS-0101, a tensile strength of 120–1500 g/cm$^2$, and a molded density of 0.06–0.35 g/cm$^3$.

2. The ceramic fiber molding of claim 1, in which the molded density is in the range of 0.15–0.35 g/cm$^3$ and the fibers are $Al_2O_3$—$SiO_2$.

3. The ceramic fiber molding of claim 1, in which the molded density is in the range of 0.06–0.20 g/cm$^3$ and the fibers are $SiO_2$.

4. The ceramic fiber molding of claim 1, in which the binder employed is selected from the group consisting of $Al_2O_3$ sol and silica sol.

5. The ceramic fiber molding of claim 1, in which the binder employed is selected from the group consisting of starch, polyvinyl alcohol, phenol resin and carboxy methyl cellulose.

6. A method of manufacturing a ceramic fiber molding comprising adding a binder to ceramic fibers selected from the group consisting of $Al_2O_3$—$SiO_2$ and $SiO_2$ ceramic fibers, and solidifying the resulting mixture to form a product having a hardness of 20°–55°, a tensile strength of 120–1500 g/cm$^2$ and a molded density of 0.06–0.35 g/cm$^3$.

7. The method of claim 6, in which a molded product is obtained by suction filtering of a solution of said ceramic fibers in said binder.

8. The method of claim 6, in which the ceramic fibers are 5.6–33 mm in length and 2.5–4.5μ in diameter.

9. The ceramic fiber molding of claim 1, which contains 2–6% by weight of said binder.

* * * * *